(12) United States Patent
Grange et al.

(10) Patent No.: US 10,789,792 B2
(45) Date of Patent: Sep. 29, 2020

(54) DUAL MODE, PASSCODE STORAGE, WIRELESS SECURE LOCK

(71) Applicant: Renesas Electronics America Inc., Milpitas, CA (US)

(72) Inventors: Robert E. Grange, Hillsboro, CA (US); Shigeru Maeta, San Jose, CA (US); Eugene G. Bonev, Los Gatos, CA (US)

(73) Assignee: Renesas Electronics America Inc., Milpitas, CA (US)

( * ) Notice: Subject to any disclaimer, the term of this patent is extended or adjusted under 35 U.S.C. 154(b) by 0 days.

(21) Appl. No.: 16/221,205

(22) Filed: Dec. 14, 2018

(65) Prior Publication Data

US 2019/0188938 A1    Jun. 20, 2019

Related U.S. Application Data

(60) Provisional application No. 62/608,306, filed on Dec. 20, 2017.

(51) Int. Cl.
| | |
|---|---|
| *H04W 12/04* | (2009.01) |
| *G07C 9/00* | (2020.01) |
| *G06F 21/60* | (2013.01) |
| *H04W 12/06* | (2009.01) |
| *H04B 5/00* | (2006.01) |
| *H02J 50/10* | (2016.01) |

(52) U.S. Cl.
CPC ....... *G07C 9/00309* (2013.01); *G06F 21/602* (2013.01); *H04B 5/0037* (2013.01); *H04W 12/04* (2013.01); *H04W 12/06* (2013.01); *G07C 9/0069* (2013.01); *G07C 2009/00412* (2013.01); *G07C 2009/00769* (2013.01); *G07C 2009/00777* (2013.01); *G07C 2009/00793* (2013.01); *H02J 50/10* (2016.02)

(58) Field of Classification Search
CPC .................. G07C 9/00309; G07C 2009/00333
USPC ....................................................... 340/5.61
See application file for complete search history.

(56) References Cited

U.S. PATENT DOCUMENTS

| | | | | |
|---|---|---|---|---|
| 7,098,791 | B2 * | 8/2006 | Okada ..................... | B60R 25/24 340/426.13 |
| 8,805,404 | B1 * | 8/2014 | Yang ..................... | G08B 21/028 455/456.1 |
| 10,083,561 | B2 * | 9/2018 | Sundaresan ........... | E05B 45/005 |
| 2011/0195701 | A1 * | 8/2011 | Cook ..................... | G01S 5/0018 455/422.1 |
| 2014/0018111 | A1 * | 1/2014 | Farley ..................... | G01S 5/0252 455/456.6 |

(Continued)

*Primary Examiner* — Qutbuddin Ghulamali
(74) *Attorney, Agent, or Firm* — Foley & Lardner LLP

(57) ABSTRACT

A dual mode, passcode storage, wireless secure lock is disclosed. In one embodiment, a key is provided that includes a key coil, a first key data processing device (DPD), a second key DPD, and a key radio transceiver. The first key DPD is configured to receive a first authentication code (AC) from a lock via the key coil. The first key DPD is configured to compare the first AC with data in memory of the key DPD. The first key DPD is configured to activate the second key DPD in response to response to determining the first AC compares equally to data in memory of the first key DPD. The second key DPD is configured to transmit a second AC to the lock via the key radio transceiver after the second key DPD is activated.

16 Claims, 6 Drawing Sheets

(56) References Cited

U.S. PATENT DOCUMENTS

| | | | |
|---|---|---|---|
| 2016/0078702 A1* | 3/2016 | Grant | G07C 9/00309 70/58 |
| 2016/0088584 A1* | 3/2016 | Kudekar | H04W 4/02 455/456.2 |
| 2016/0301849 A1* | 10/2016 | E | H04N 1/00307 |
| 2019/0005802 A1* | 1/2019 | Fawcett | G08B 13/2465 |

* cited by examiner

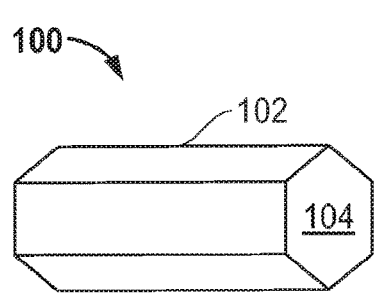
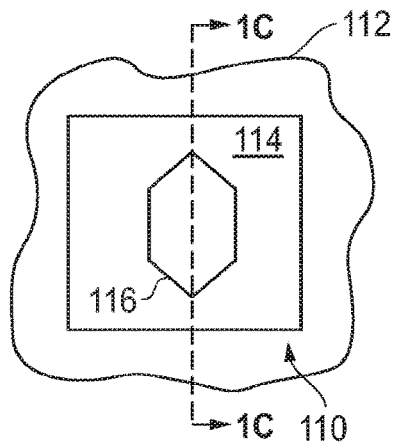
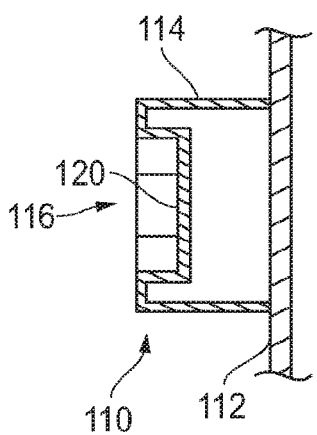
FIG. 1A          FIG. 1B          FIG. 1C
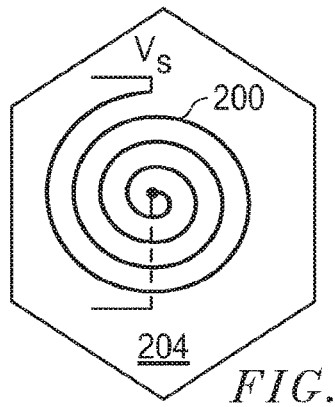
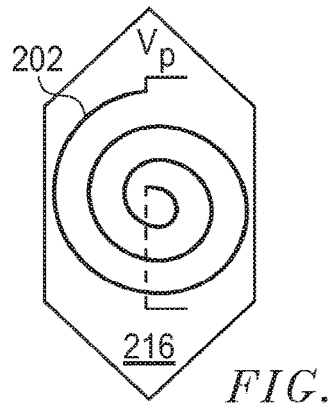
FIG. 2A          FIG. 2B
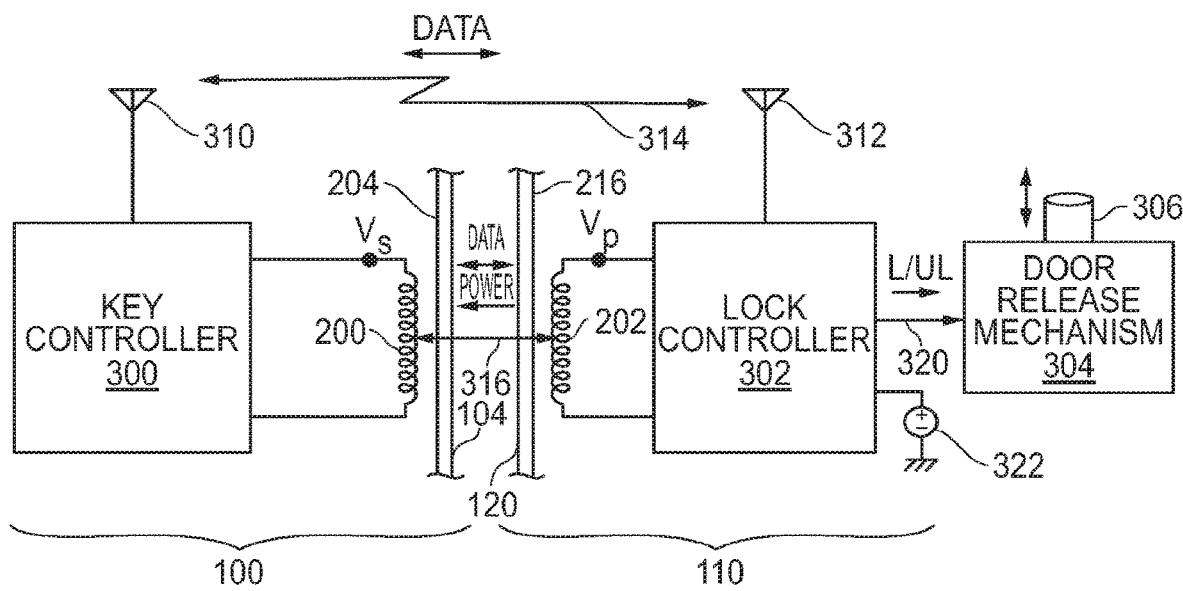
FIG. 3

DUAL MODE, PASSCODE STORAGE, WIRELESS SECURE LOCK

CROSS-REFERENCE TO RELATED APPLICATIONS

The present application claims priority to U.S. Provisional Patent Application No. 62/608,306 filed Dec. 20, 2017, the contents of which are incorporated herein by reference in their entirety.

BACKGROUND

A lock is a mechanical or electronic fastening device that is released by a physical object (e.g., a mechanical key, keycard, fingerprint, security token etc.), by supplying secret information (e.g., a passcode), or by a combination thereof. A wireless lock is an electro mechanical lock that gets release instructions from an authorized device using a passcode and a wireless protocol.

SUMMARY

A dual mode, passcode storage, wireless secure lock is disclosed. In one embodiment, a key is provided that includes a key coil, a first key data processing device (DPD), a second key DPD, and a key radio transceiver. The first key DPD is configured to receive a first authentication code (AC) from a lock via the key coil. The first key DPD is configured to compare the first AC with data in memory of the key DPD. The first key DPD is configured to activate the second key DPD in response to response to determining the first AC compares equally to data in memory of the first key DPD. The second key DPD is configured to transmit a second AC to the lock via the key radio transceiver after the second key DPD is activated.

BRIEF DESCRIPTION OF THE DRAWINGS

In order that the advantages of the invention will be readily understood, a more particular description of the invention briefly summarized above will be rendered by reference to specific embodiments that are illustrated in the appended figures. Understanding that these figures depict only some embodiments of the invention and are not therefore to be considered to be limiting of its scope, the invention will be described and explained with additional specificity and detail through the use of the accompanying figures.

FIG. 1A is a prospective view of an electronic key.

FIG. 1B is a front view of an electronic lock.

FIG. 1C is a cross-sectional view of the lock in FIG. 1B taken along line C-C.

FIG. 2A illustrates an example inductor coil contained inside the key of FIG. 1A.

FIG. 2B illustrates an example inductor coil contained inside the lock of FIG. 1B.

FIG. 3 shows relevant components that are contained inside the key and lock of FIGS. 1A and 1B according to one embodiment of the present invention.

The use of the same reference symbols in different drawings indicates similar or identical items.

DETAILED DESCRIPTION

Figure 4A:
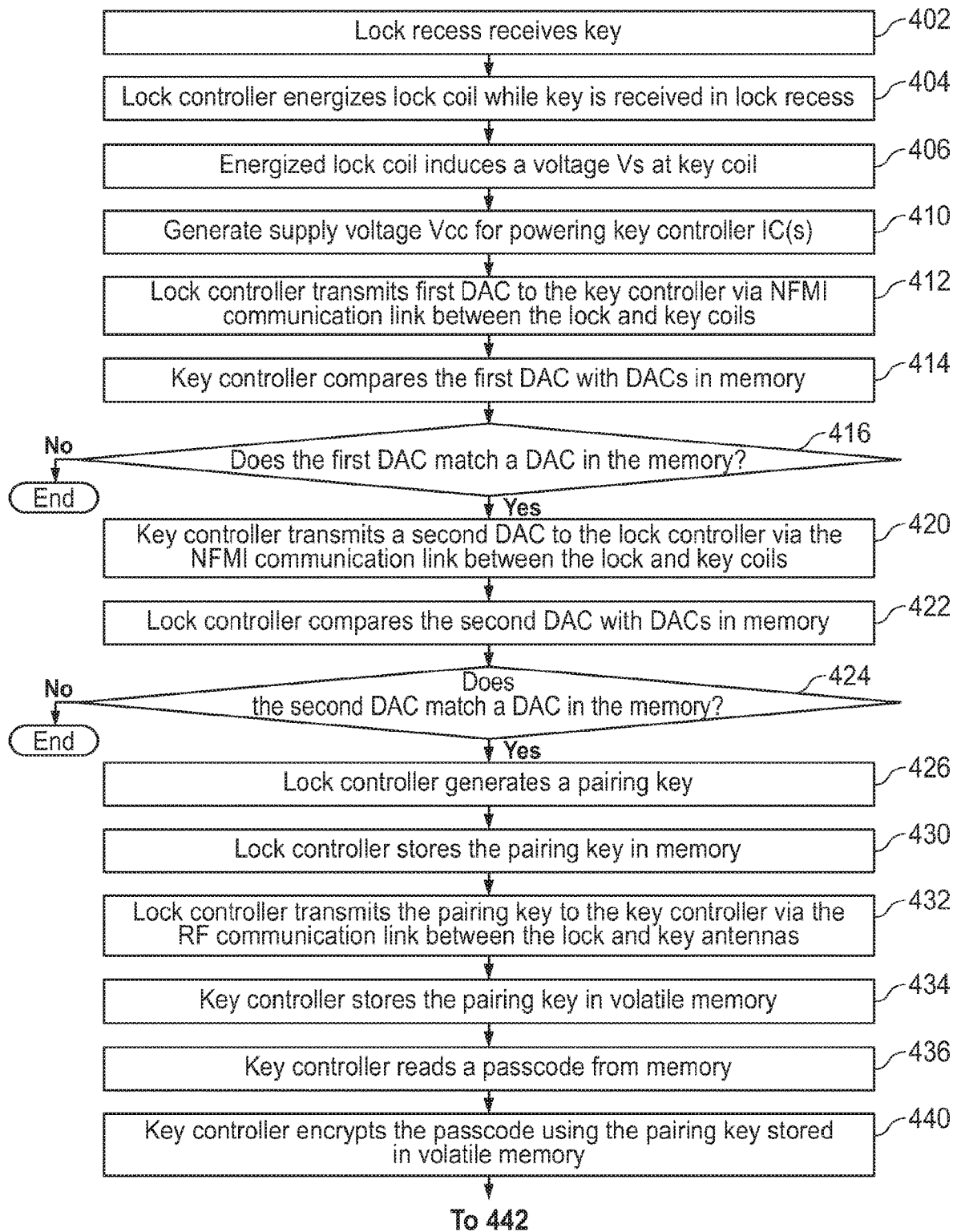
FIGS. 4A and 4B depict a flow chart illustrating relevant aspects of a process performed by the components shown in FIG. 3.

It will be readily understood that components of the invention, as generally described and illustrated in the figures herein, may be designed and arranged in a wide variety of different configurations. Thus, the following detailed description of the embodiments of the apparatus, system, and method of the invention, as represented in the attached figures, is not intended to limit the scope of the invention, as claimed, but is merely representative of selected embodiments of the invention.

The features, structures, or characteristics of the invention described throughout this specification may be combined in any suitable manner in one or more embodiments. For example, reference throughout this specification to "an embodiment," "some embodiments," or similar language means that a particular feature, structure, or characteristic described in connection with the embodiment is included in at least one embodiment of the invention. Thus, appearances of the phrases "in one embodiment," "in other embodiments," or similar language throughout this specification do not necessarily all refer to the same group of embodiments, and the described features, structures, or characteristics may be combined in any suitable manner in one or more embodiments.

Disclosed is a wireless, electronic lock system (hereinafter lock system), which can be used to prevent unauthorized access to objects such as shipping containers, buildings, vaults, computers, etc. The present invention will be described with reference to a lock system used with a shipping container, but the present invention should not be limited thereto.

FIGS. 1A-1C illustrate high level aspects of an example lock system employing one embodiment of the present invention. The example lock system includes an electronic key 100 and an electronic lock 110. FIG. 1A is a prospective view of electronic key 100, while FIG. 1B is a front view of electronic lock 110. FIG. 1C is a cross-sectional view of lock 110 taken along line C-C in FIG. 1B.

Both key 100 and lock 110 include one or more integrated circuits (ICs) that are more fully described below. Key 100 lacks a battery. However, lock 110 can wirelessly transmit power needed to operate the one or more ICs of key 100. The wireless power transfer is accomplished by means of magnetic induction between inductor coils in key 100 and lock 110. FIG. 2A illustrates an example inductor coil 200 contained inside key (hereinafter key coil) 100, and FIG. 2B illustrates an example inductor coil 202 contained inside lock (hereinafter lock coil) 110.

Lock 110 contains a power source such as a battery. Lock 110 can energize lock coil 202 by applying an AC voltage thereto. Energized lock coil 202 creates a magnetic field. Magnetic fields around an inductor coil decrease exponentially with distance. If the distance between coils 200 and 202 is relatively small, the magnetic field created by energized lock coil 202 will induce a voltage at key coil 200, which can be used to power key 100 ICs. A method that allows slightly larger distance between the inductor coils is called resonant inductive coupling. The present invention will be described with reference to power transfer via magnetic induction, it being understood the present invention should not be limited thereto.

In addition to wireless power transfer, data for authenticating key 100 can be wirelessly exchanged between key 100 and lock 110 using near field magnetic induction (NFMI) communication and radio frequency (RF) communication. NFMI is a short range wireless physical layer that communicates by coupling a tight, low-power, non-propagating magnetic field between devices. The concept is for a transmitter coil (e.g., lock coil 202 key or coil 200) in one device to modulate a magnetic field which is measured by means of a receiver coil (e.g., key coil 200 or lock coil 202) in another device. NFMI communication differs from conventional RF communication systems that use an antenna to generate and transmit a propagated electromagnetic wave. In RF communication systems all of the transmission energy is designed to radiate into free space. RF transmission is referred to as "far-field."

With continuing reference to FIGS. 1A-1C, 2A and 2B, key 100 includes a housing 102. Key coil 200 is contained in a plane that is positioned parallel with and close to internal surface 204 of housing 102. An external end surface 104 (FIG. 1A) faces a direction opposite to the direction faced by internal surface 204. Lock 110 includes a housing 114 with a recess 116 that ends in an external surface 120 of housing 114. Lock coil 202 is contained in a plane that is positioned parallel with and close to internal surface 216 of housing 114. External end surface 120 (FIGS. 1B and 1C) 114 faces a direction opposite to the direction faced by internal surface 216. Lock 110 is integrally connected to an access control object (e.g., door) 112 of an object (e.g., shipping container).

The cross-sectional shape and size of key housing 102 matches the cross-sectional shape and size of lock recess 116. In the embodiment shown in FIGS. 1A-1C, the cross-sectional shapes of key housing 102 and lock recess 116 is hexagonal, but other shapes are contemplated. Importantly, the size and shape of key housing 102 matches the size and shape of lock recess 116 so that key housing 102 can be inserted into lock recess 116. When key 100 is fully inserted, the distance between coils 200 and 202 is small enough that power can be wirelessly transmitted from lock 110 to key 100 via magnetic induction. Moreover, when key 100 is fully inserted into recess 116, data, including authentication codes and passcodes, can be exchanged between key 100 and lock 110 using both NFMI communication and RF communication as will be more fully described below. If the cross-sectional shape and size of key housing 102 does not match the cross-sectional shape and size of lock recess 116, it may not be possible for power or data to be transmitted between key 100 and lock 110.

FIG. 3 shows relevant components that are contained inside the housings of key 100 and lock 110 according to one embodiment of the present invention. In addition to coil 200, key 100 includes a key controller 300 and RF antenna 310. Lock 110 includes a lock controller 302, power source (e.g., battery) 322, and RF antenna 312. A release mechanism 304 is mounted on door 112 and includes a pin 306 that is movable into or out of a recess (not shown) in the shipping container door frame. Door release mechanism 304 receives lock and unlock signals from lock controller 302. When door release mechanism 304 receives an unlock signal, door release mechanism 304 retracts pin 306 from the frame recess, which allows door 112 to be opened, and when door release mechanism 304 receives a lock signal, door release mechanism 304 inserts pin 306 into the frame recess thereby locking door 112. As shown in FIG. 3, key coil 200 is directly connected to key controller 300, and lock coil 202 is directly connected to lock controller 302. Coils 200 and 202 are shown schematically in FIG. 3. It should also be noted that key 100 and lock 110 may include additional components that are not shown within FIG. 3.

Key controller 300 may include one or more integrated circuits (ICs) mounted on a printed circuit board (not shown). Moreover, in an alternative embodiment RF antenna 310 can be formed as an integrated antenna on the printed circuit board of key controller 300. Like key controller 300, lock controller 302 may include one or more integrated circuits mounted on a printed circuit board. In an alternative embodiment RF antenna 312 can be formed as an integrated antenna on the printed circuit board of key lock 302. An RF antenna is the interface between RF waves propagating through space and electric currents moving in metal conductors. In transmission, a transmitter supplies an electric current to the antenna's terminals, and the antenna radiates the energy from the current as electromagnetic waves (i.e., RF waves). In reception, an antenna intercepts some of the power of an RF in order to produce an electric current at its terminals, which is applied to a receiver to be amplified. Antennas 310 and 312 enable RF communication link 314 between key 100 and lock 110. RF waves carry data by systematically modulating properties of electromagnetic waves transmitted over RF communication link 314, such as their amplitude, frequency, phase, or pulse width. Coils 200 and 202 enable NFMI communication between key 100 and lock 110. The amplitude, frequency, phase, etc., of the magnetic field established between coils 200 and 202 is modulated with the data to be transmitted.

As noted, key 100 lacks a battery. However, lock 110 can wirelessly transmit energy needed by key controller 300. To this end, lock controller 302 can energize coil 202 with an AC voltage. With key 100 fully received in the recess 116 of lock 110, coils 200 and 202 should be close enough that energized lock coil 202 induces a voltage Vs at key coil 200 through magnetic induction. Key controller 300 internally generates a supply voltage Vcc from induced voltage Vs. Supply voltage Vcc powers key controller 300. When powered up key controller 300 and lock controller 302 can wirelessly communicate (i.e., transmit data) with each other via NFMI link 316 and RF communication link 314. Wireless communication between key controller 300 and lock controller 302 can occur only while voltage Vs is induced at coil 200.

Figure 4B:
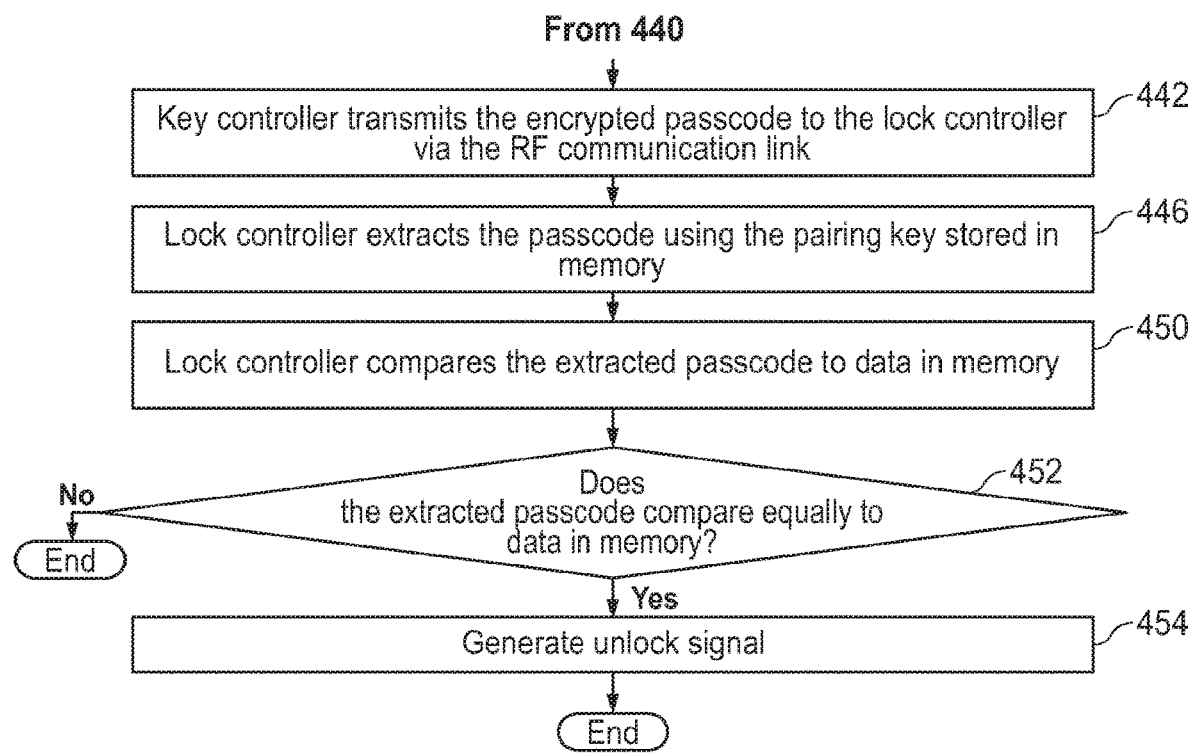

With continued reference to FIG. 3, FIG. 4 illustrates an example process implemented by lock 110 and key 100. The process begins when lock 110 is received far enough in recess 116 of lock 110 to enable power transfer from coil 202 to coil 200. Lock controller 302 may include a mechanism that detects the presence of key 100 in recess 116. For example, lock controller 302 can repeatedly send a low power ping via coil 202 with a certain AC frequency to check if key coil 200 (and thus key 100) is present in recess 116. Lock controller 302 can detect coil loading or a slight change in resonance using the pings, which signifies presence of key coil 200 in recess 116. Other mechanisms for detecting the presence of key 100 are contemplated.

When presence of key 100 is detected, lock controller 302 energizes lock coil 202 with an AC voltage at step 404. The energized lock coil 202 induces a voltage Vs at key coil 200, and key controller 300 internally generates a DC supply voltage Vcc from Vs as shown in step 406. In one embodiment, key controller 300 may include a rectifier and voltage regulator that generates supply voltage Vcc from Vs. When generated Vcc activates or powers up one or more ICs contained within key controller 300 as shown in step 410.

In addition to energizing lock coil 202, lock controller 302 transmits a first digital authentication code (DAC) to key controller 300 via NFMI communication link 316 as shown in step 412. Key controller 302 uses the first DAC to authenticate lock 410. In step 414, activated key controller 300 compares the first DAC with data stored in memory thereof. In one embodiment, memory of key controller 300 stores a table of DACs. Key controller 300 can compare the first DAC it receives with DACs contained within the table. If a match is found between the first DAC and a DAC stored within the table, key controller 300 reads a second DAC that is mapped to the first DAC in the table, and transmits this second DAC to lock controller 302 via NFMI communication link 316 as shown in step 420. If, however, the key controller 300 does not find a match between the first DAC and DACs stored within the table, the process of FIG. 4 will end. In one embodiment, lock controller 302 starts an internal timer when the presence of key 100 is detected. The process of FIG. 4 will end and no unlock signal will be generated if the timer expires before step 454 is implemented. Although not shown, key 100 may include a data port through which the DAC table in key controller 300 memory can be programmed or reprogrammed with new or updated DAC pairings.

Assuming lock controller 302 receives the second DAC, lock controller 302 compares the second DAC with data in a table of memory thereof as shown in step 422. If a lock controller 302 does not find a match between the second DAC and DACs contained within this table, the process of FIG. 4 ends. However, if a match is found, lock controller 302 generates a third DAC (e.g., a pairing key) as shown in step 426, which is stored in memory as shown in step 430. Like key 100, lock 110 may include a data port through which the DAC table in controller 302 memory can be programmed or reprogrammed with new or updated DAC pairings.

Lock controller 302 transmits the pairing key to key controller 300 via RF communication link 314 in step 432. Key controller 300 receives and stores the pairing key in volatile memory thereof. Memory that holds data as long as it has power supply voltage connected to it is called volatile memory. RAM is the best example of volatile memory, which will hold data only as long as it is connected to a supply voltage, and everything in it will be cleared if it gets disconnected from the power supply voltage. The third DAC that is stored in volatile memory of controller 300 will be lost if Vs, and thus Vcc, is lost, which will happen when key 100 is removed from recess 116.

Key controller 300 as shown in step 436 reads a fourth DAC (e.g., a passcode) from memory thereof. Key controller 300 encrypts the passcode using the pairing key as shown in step 440. Key controller 300 transmits the encrypted passcode in a message to lock controller 302 via RF communication link 314. In response to receiving the message, lock controller 302 extracts the passcode using the pairing key that is stored in its memory in step 446. The extracted passcode is compared to one or more passcodes in memory of lock controller 302. If a match is found for the passcode in memory of lock controller 302, lock controller 302 generates the unlock signal that is provided to locking mechanism 304. Otherwise, the process of FIG. 4 ends.

Figure 5:
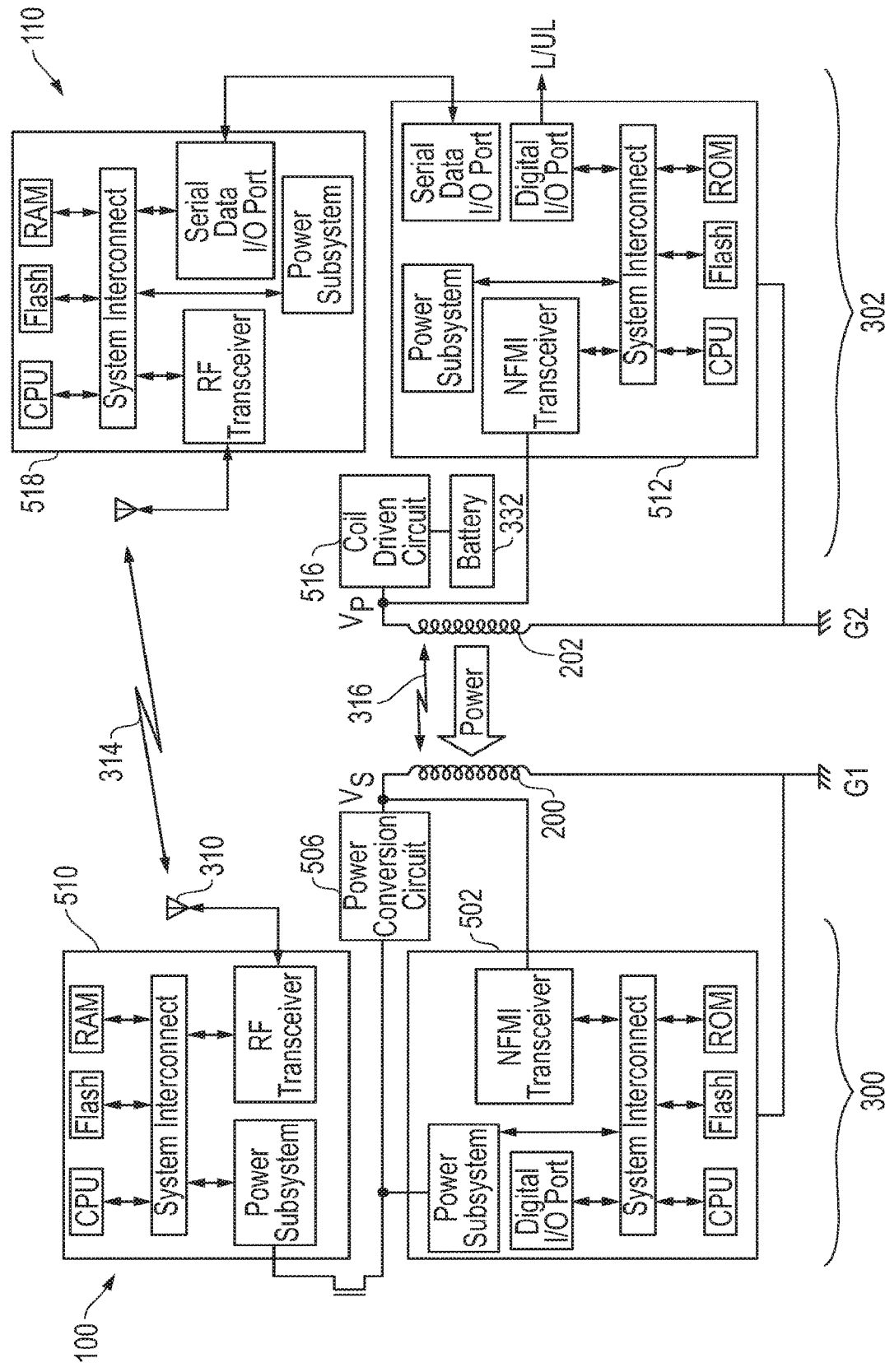
FIG. 5 shows a more detailed view of relevant components that are contained inside the key and lock of FIGS. 1A and 1B according to one embodiment of the present invention.
Figure 6A:
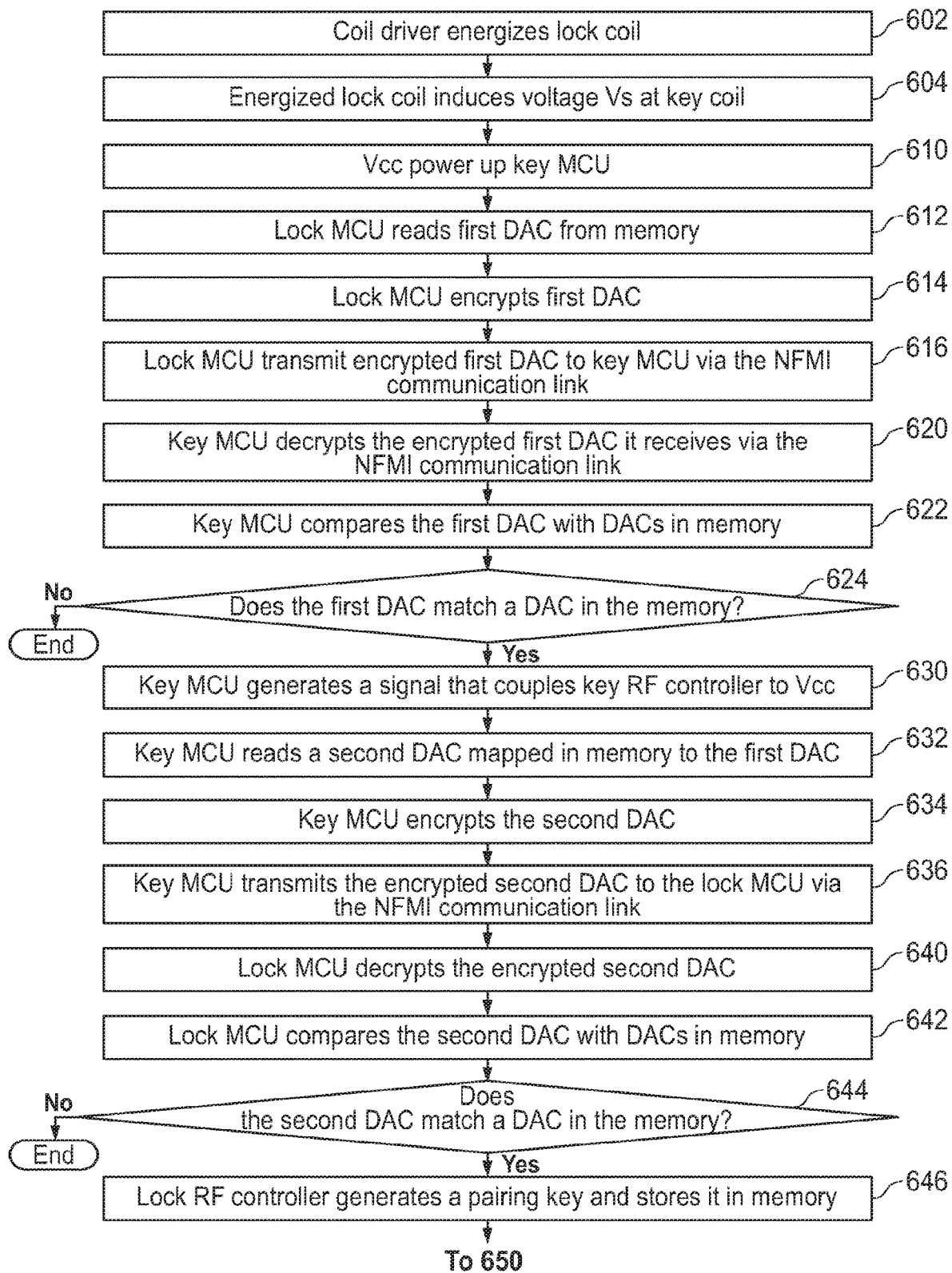
FIGS. 6A and 6B depict a flow chart illustrating relevant aspects of a process performed by the components shown in FIG. 5.
Figure 6B:
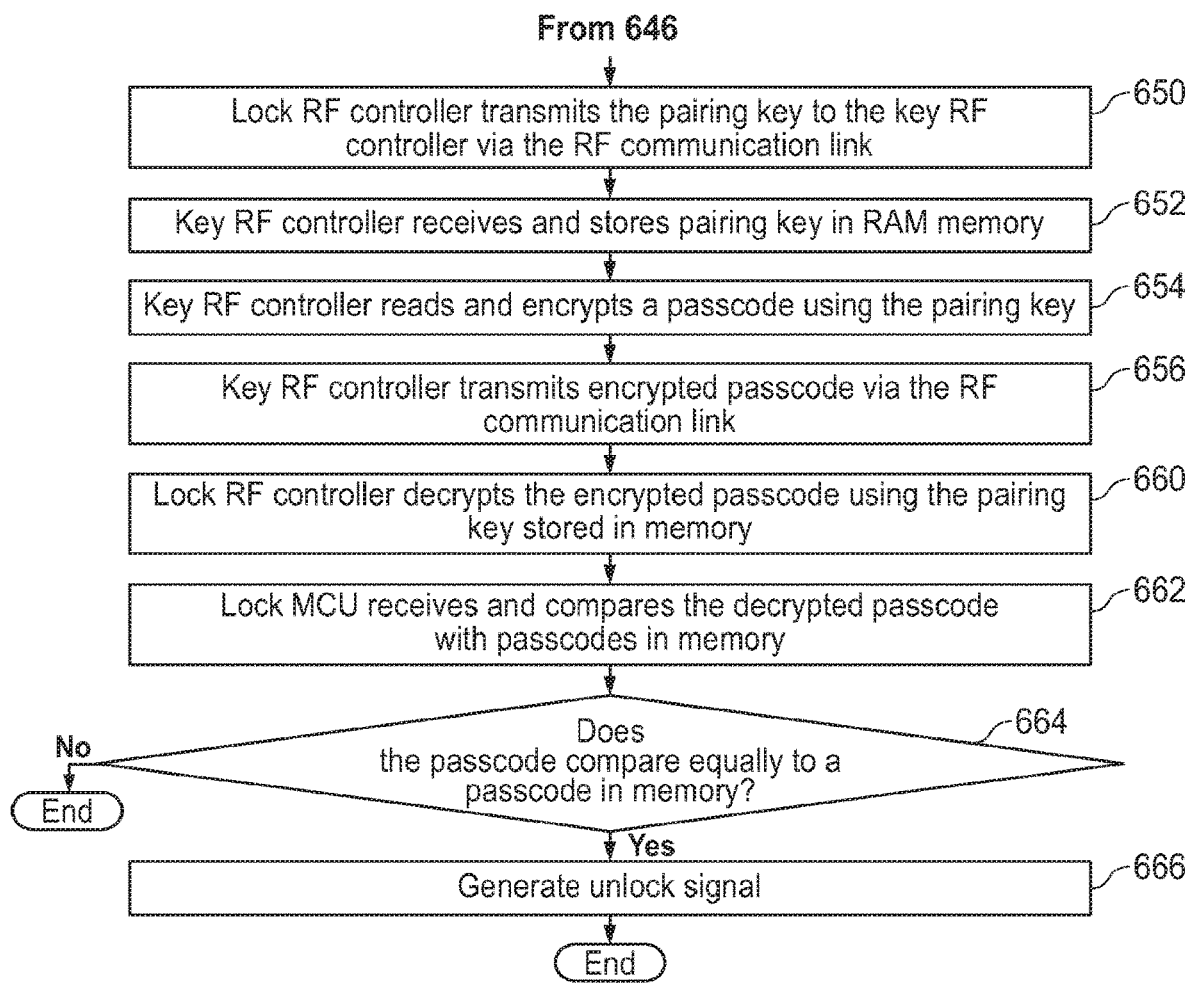

FIGS. 5 and 6 illustrate more detailed aspects of key controller 300 and lock controller 302. Key controller 300 in FIG. 5 includes several ICs, which can be mounted on a printed circuit board (not shown). Similarly, lock controller 302 includes several ICs, which can be mounted on a printed circuit board (not shown). ICs of key controller 300 can communicate with each other via electrically conductive traces formed on a printed circuit board of key 100, and ICs of lock controller 302 can communicate with each other via electrically conductive traces formed on a printed circuit board of lock 110. An IC is an electronic device formed on a semiconductor die using well-known semiconductor manufacturing techniques.

Key controller 300 includes a key MCU 502, power conversion circuit 506, switch (e.g., power MOSFET), and key RF controller 510. Key MCU 502 includes a processing unit (e.g., CPU), flash memory, system interconnect, power subsystem, and several peripheral devices such as key NFMI transceiver, digital I/O port, etc. Key RF controller includes a CPU, flash memory, system interconnect, power subsystem, volatile RAM memory, and several peripheral devices such as a key RF transceiver, etc. Lock controller 302 includes a lock MCU 512, coil driver circuit 516, and lock RF controller 518. Lock MCU 512 includes a CPU, flash memory, system interconnect, power subsystem, and several peripheral devices such as lock NFMI transceiver, serial I/O port, etc. Lock RF controller includes a CPU, flash memory, system interconnect, power subsystem, and several peripheral devices such as lock RF transceiver, etc. Each CPU in FIG. 5 can execute instructions stored in its corresponding flash memory.

With continuing reference to FIG. 5, FIG. 6 illustrates relevant aspects of a process implemented by the various components shown within FIG. 5. Although not shown in the figures, lock controller 302 may include a mechanism through which lock controller 302 may detect the presence of key 102 within recess 116. When the presence of key 102 is detected, lock MCU 512 activates coil driver circuit 516 as shown in step 602.

Activated coil driver circuit 516 is configured to convert the DC power provided by battery 332 into an AC voltage that is applied to lock coil 202, which in turn induces voltage Vs at key coil 200. Again, it is noted that key coil 200 must be sufficiently close to lock coil 202 for energized coil 202 to induce Vs at coil 200. Power conversion circuit 506, which may include a rectifier and/or a linear regulator, converts the induced voltage Vs at coil 200 into DC power supply voltage Vcc using passive components (e.g., diodes, capacitors, resistors, etc., not shown) in one embodiment. Vcc, when established, powers up key MCU 502. In one embodiment, this means the power subsystem of key MCU 502 generates a start signal when it detects supply voltage Vcc has been established. In response to the start signal the CPU of key MCU 502 activates and executes a startup program. After the startup program has completed, the CPU in key MCU 502 executes a main program in flash memory. At that point the CPU in key MCU 502 is ready to communicate with lock MCU 514 via NFMI communication link 316. It should be noted that initially, key RF controller 510 is not connected to Vcc when Vcc is first established.

As shown in step 612, the CPU of lock MCU 512 reads the first DAC from flash memory. The CPU encrypts the first DAC in accordance with instructions of an encryption algorithm stored in its flash memory. In an alternative embodiment, MCU 12 includes an encryption/decryption engine peripheral that encrypts the first DAC. Lock MCU 512 transmits the encrypted data to key MCU 502 via NFMI communication link 316. More particularly, the NFMI transceiver of lock MCU 514 can modulate a carrier wave with the first DAC, and apply the result to coil 202. The key NFMI transceiver detects and demodulates the signal induced at coil 202, to reveal the encrypted first DAC. The CPU of key MCU 502 decrypts this data in accordance with instructions stored within its flash memory to reproduce the first DAC. In an alternative embodiment, an encryption/decryption engine peripheral (not shown) of key MCU 502 can decrypt the data. Key MCU 300 compares the first DAC with DACs in flash memory or ROM (not shown) in step 622. If the CPU determines that there is a match between first DAC and a DAC in memory of key MCU 502, the process shown in FIG. 6 continues with step 624. However, if the result of the first DAC does not match a DAC in memory of key MCU 502, the process stops and as a result, lock MCU 512 will not generate an unlock signal.

If there is a match of the first DAC and a DAC stored in memory, key MCU 502 generates a signal that closes switch 508 in step 630, which in turn connects the power subsystem of key RF controller 510 to supply voltage Vcc. In one embodiment the power subsystem of lock key RF controller 510 detects Vcc and generates a start signal in response. The CPU of key RF controller 510 initiates a startup program stored in flash memory in response to CPU receiving the start signal. Key RF controller 510 initiates a main program stored in flash memory upon completion of the startup program. At that point, key RF controller 510 can wirelessly communicate with lock RF controller 518.

In addition to closing switch 508, the CPU of key MCU 502 reads a second DAC that is mapped in memory to the first DAC in memory as shown in step 632. Key MCU 502 encrypts the second DAC as shown in step 634 using instructions of an encryption algorithm stored in flash memory. Alternatively, an encryption/decryption engine peripheral (not shown) of key MCU 502 can encrypt the second DAC. Key MCU 502 transmits the encrypted second DAC to lock MCU 512 via NFMI communication link 316. More particularly, the NFMI transceiver of key MCU 502 can modulate a carrier wave with the second DAC, and apply the result to coil 200. The lock NFMI transceiver detects and demodulates the signal induced at coil 200, to reveal the encrypted second DAC. The CPU of lock MCU 512 decrypts this data in step 640 in accordance with instructions stored within its flash memory to reproduce the second DAC. In an alternative embodiment, an encryption/decryption engine peripheral (not shown) of lock MCU 512 can decrypt the data. At step 642, lock MCU 512 compares the second DAC with DACs in memory. If the second DAC does not match a DAC in memory of lock MCU 512, the process stops. If, however, the second DAC matches a DAC contained in memory of lock MCU 512, lock MCU 512 sends an instruction to lock RF controller 518 to initiate a process to establish RF communication with key RF controller 510.

In one embodiment, key RF controller 510 and lock RF controller 518 use Bluetooth Low Energy (BLE) to establish communication therebetween. BLE is rapidly becoming one of the most common wireless standards in use today. Likewise, it is also becoming more commonly used in applications where sensitive information is being transferred. BLE uses a pairing process by which two BLE devices exchange device information so that secure link can be established. During this pairing process, lock RF controller 518 generates a third DAC (e.g., a pairing key) and stores it in memory thereof as shown in step 646. Once the pairing key is generated, lock RF controller 518 transmits it to key RF controller 510 via antennas 310 and 314. It is noted that in one embodiment, lock RF controller 518 may include an encryption algorithm that encrypts the pairing key before it is wirelessly transmitted to key RF controller 510. In this embodiment, key RF controller 510 includes an algorithm for decrypting data it receives from lock RF controller 518.

In step 652 key RF controller 510 receives the pairing key and stores it in volatile memory (RAM memory). The volatile memory in key RF controller 510 retains data only while supply voltage Vcc is constantly provided thereto; if Vcc is lost, the pairing key is likewise lost. With continuing reference to FIGS. 5 and 6, the CPU of key RF controller 510 accesses a third DAC (e.g., a passcode) stored in flash memory. The CPU of key RF controller 510 encrypts the passcode in accordance with instructions of the main program stored within flash memory. In the embodiment shown, key RF controller 510 encrypts the passcode using the pairing key stored in volatile memory. The encrypted passcode is wirelessly transmitted to lock RF controller 518 via the RF transceivers and antennas shown within FIG. 5. Lock RF controller 518 decrypts the encrypted passcode using the pairing key stored in memory as shown in step 656. The passcode is subsequently provided to lock MCU 512, and lock MCU 512 compares the passcode it receives with passcodes in memory thereof. If there is a match, MCU generates the unlock signal that is provided to locking mechanism 304 shown in FIG. 3. Otherwise, the process stops.

The process shown in FIG. 6 provides at least two levels of authentication before key controller 302 generates the unlock signal in step 666. The first level involves the NFMI exchange of the first and second DACs between lock MCU 512 and key MCU 514. When the key MCU 502 and lock MCU 512 confirm the authenticity of these DACs by finding a match in memory, the second level of authentication is initiated in which the passcode is encrypted by the key controller using a lock controller generated pairing key. The encrypted passcode is subsequently transmitted from key RF controller 510 to lock RF controller 518 via RF communication link 314. MCU 512 authenticates the passcode before it generates the unlock signal. The example system provides security features. For example, the exchanges of the DACs and passcode occur very fast, which reduces the chances of interception using wireless snooping technology. Further, one of ordinary skill will appreciate that once the key 100 is removed from recess 116 of lock 110, the pairing key stored within volatile memory of key RF controller 510 will be lost since power conversion circuit 506 no longer provides Vcc.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:
1. A method comprising:
energizing a first coil to induce a voltage at a second coil;
activating a first data processing device (DPD) using the voltage induced at the second coil;
transmitting a first authentication code (AC) via the first and second coils;
the activated first DPD comparing the first AC to data in a first memory;
in response to the first DPD detecting a match between the first AC and data in the first memory, the first DPD generating a signal;
activating a second DPD in response to the generation of the signal;
transmitting a second AC via a first radio transceiver;

the activated second DPD storing the second AC in volatile memory of the activated second DPD;
reading a third AC from non-volatile memory;
the second DPD generating a message using the second AC and the third AC; and
transmitting the message via a second radio transceiver.

2. The method of claim 1:
wherein the first DPD activates the second DPD by closing a switch between the second DPD and the induced voltage, wherein the second AC is held in the volatile memory only while the switch is closed;
wherein the second AC is held in the volatile memory only while the induced voltage is present at the second coil.

3. The method of claim 2:
wherein the first coil, the first radio transceiver, and a power source are contained in a first device;
wherein the second coil, first DPD, second DPD, and the second radio transceiver is contained in a second device;
wherein the second device lacks a battery;
wherein the first device comprises a first housing;
wherein the first housing comprises a recess;
wherein the first coil is contained in the first housing and positioned adjacent to a surface of the recess;
wherein the second device comprises a second housing;
wherein the second housing comprises an extension with a cross-sectional shape that matches a cross-sectional shape of the recess so that the recess can receive the extension;
wherein the second coil is contained in the extension and positioned adjacent to a surface of the extension so that when the extension is fully received by the recess (1) the first coil can induce the voltage in the second coil via a magnetic field, and (2) the first AC can be transmitted between via the first and second coils.

4. The method of claim 3 further comprising:
transmitting a fourth AC from the second device to the first device via the first and second coils;
a third DPD comparing the fourth AC to data in a third memory; and
the third DPD generating a lock release signal in response to the third DPD determining that the fourth AC compares equally to data in the third memory.

5. The method of claim 4 further comprising:
transmitting the second AC via the first radio transceiver in response to the third DPD determining that the fourth AC compares equally to data in the third memory;
receiving the message via the first radio transceiver;
extracting the third AC from the message received via the first radio transceiver;
comparing the extracted third AC with data in the third memory; and
the third DPD generating the lock release signal in response to a determination that the extracted third AC compares equally to data in the third memory.

6. The method of claim 5, further comprising:
generating the second AC via a fourth DPD; and
storing the second AC in a fourth memory of the fourth DPD,
wherein the fourth DPD generates a new second AC and overwrites the second AC with the new second AC.

7. An apparatus comprising:
a first device comprising a first coil, a first data processing device (DPD) coupled to the first coil, and a first radio transceiver; and
a second device comprising a second coil, a second DPD coupled to the second coil, and a second radio transceiver;
wherein the first DPD is communicatively coupleable with the second DPD via the first and second coils, to transmit a first authentication code (AC) to the second DPD;
wherein the second DPD is communicatively coupleable with a memory of the second DPD, to compare the first AC with data in the memory of the second DPD;
wherein the second device is configured communicatively coupleable with the first device via the first and second radio transceivers, to transmit a second AC to the first device in response to the second DPD finding a match between the first AC and the data in the memory of the second DPD.

8. The apparatus of claim 7 wherein the second device further comprises:
a third DPD selectively coupled to the second coil via the second DPD, in response to the second DPD finding the match between the first AC and the data in the memory of the second DPD.

9. The apparatus of claim 8:
wherein the second device lacks a battery;
wherein the first coil, when energized, can induce a voltage at the second coil;
wherein the second device transmits the second AC only while the first coil induces the voltage at the first coil, and only while the third DPD is coupled to the second coil.

10. The apparatus of claim 9:
wherein the first device comprises a first housing;
wherein the first housing comprises a recess;
wherein the second device comprises a second housing;
wherein the second housing comprises an extension with a cross-sectional shape that matches a cross-sectional shape of the recess so that the recess can receive the extension;
wherein the second coil is contained in the extension and positioned adjacent to a surface of the extension so that when the extension is fully received by the recess (1) the first coil can induce the voltage at the second coil via a magnetic field, and (2) a modulated and encoded version of the first AC can be transmitted between the first and second coils.

11. The apparatus of claim 10:
wherein the second device comprises a switch coupled between the second coil and the third DPD;
wherein the second DPD generates a signal to close the switch in response to the second DPD finding the match between the first AC and the data in the memory of the second DPD;
wherein the third DPD is activated using the voltage induced at the second coil only while the switch is closed.

12. The apparatus of claim 11:
wherein the third DPD is communicatively coupleable to the second coil to receive and store a second AC in volatile memory thereof only when the first coil induces the voltage at the second coil;
wherein third DPD receives the second AC from the first device via the first and second radio transceivers.

13. The apparatus of claim 12:
wherein the second DPD is configured communicatively coupleable to the first device via the first and second coils, to transmit a third AC to the first device, wherein the first DPD is communicatively coupleable to a memory thereof, to compare the third AC to data in the memory thereof;

the first DPD generating a lock release signal in response to the first DPD determining that the third AC compares equally to the data in the memory thereof.

14. The apparatus of claim 12 wherein the first device further comprises:

a fourth DPD is configured communicatively coupleable a memory thereof, to generate the second AC and to store the second AC in the memory thereof.

15. The apparatus of claim 14:

wherein the third DPD is configured to generate a message using the second AC and a fourth AC;

wherein the fourth DPD is configured to extract the fourth AC from the message;

wherein the second DPD is configured to compare the extracted fourth AC with data in a memory thereof;

wherein the second DPD is configured to generate the lock release signal in response to determining that the extracted fourth AC compares equally with the data in the memory thereof.

16. The apparatus of claim 15:

wherein the fourth DPD when activated is configured to generate the second AC and store it in the fourth memory;

wherein the fourth DPD is configured to generate a new second AC and overwrites the second AC with the new second AC.

* * * * *